United States Patent
Anderberg et al.

(10) Patent No.: US 12,150,032 B2
(45) Date of Patent: Nov. 19, 2024

(54) MULTI-ROUTER WIRELESS COMMUNICATION SYSTEM WITH CLIENT BALANCING

(71) Applicant: Icomera AB, Gothenburg (SE)

(72) Inventors: Martin Anderberg, Gothenburg (SE); Erik Dahlbom, Gothenburg (SE)

(73) Assignee: Icomera AB, Gothenburg (SE)

( * ) Notice: Subject to any disclaimer, the term of this patent is extended or adjusted under 35 U.S.C. 154(b) by 265 days.

(21) Appl. No.: 17/556,507

(22) Filed: Dec. 20, 2021

(65) Prior Publication Data
US 2022/0201588 A1    Jun. 23, 2022

(30) Foreign Application Priority Data
Dec. 21, 2020    (SE) .................................... 2051515-1

(51) Int. Cl.
*H04W 40/24*    (2009.01)
*H04L 45/58*    (2022.01)
(Continued)

(52) U.S. Cl.
CPC ............. *H04W 40/24* (2013.01); *H04L 45/58* (2013.01); *H04W 4/40* (2018.02); *H04W 48/02* (2013.01); *H04W 76/14* (2018.02)

(58) Field of Classification Search
CPC ....... H04W 48/02; H04W 4/40; H04W 76/14; H04W 40/24; H04L 45/58
(Continued)

(56) References Cited

U.S. PATENT DOCUMENTS 7,881,208 B1    2/2011   Nosella et al.
8,037,204 B2    10/2011  Breton et al.
(Continued)

FOREIGN PATENT DOCUMENTS

EP    1175757 A1    1/2002
EP    2943011 A1    11/2015
(Continued)

OTHER PUBLICATIONS

Dynamic Management of Multiple Mobile Routers, Tsukada, Ernst, Wakikawa, and Mitsuya (Year: 2005).*
(Continued)

*Primary Examiner* — Peter G Solinsky
(74) *Attorney, Agent, or Firm* — Kagan Binder, PLLC (57) ABSTRACT

A wireless communication system for a moving vehicle, said wireless communication system comprising: a plurality of routers, each router being configured to receive and transmit wireless data communication to and from a stationary communication server outside the moving vehicle through at least one exterior mobile network via at least one antenna; receive and transmit data packets to and from at least one client onboard the moving vehicle; and communicate with every other router in said moving vehicle in order to receive and transmit data packets to and from said every other router, thereby forming an onboard router network. Each router is arranged to receive a media access control address (MAC address) from any client connecting to the onboard router network, and wherein each router is provided with a set of MAC address representations, representing MAC addresses to accept or to ignore, and wherein each router is arranged to analyze said received MAC address and compare it to its set of MAC address representations, and to determine, based on said analysis whether to accept or
(Continued)

ignore said client. Hereby, a very efficient and scalable client balancing is obtained, which also provides redundancy.

21 Claims, 2 Drawing Sheets (51) Int. Cl.
*H04W 4/40* (2018.01)
*H04W 48/02* (2009.01)
*H04W 76/14* (2018.01)

(58) Field of Classification Search
USPC .......................................................... 370/329
See application file for complete search history.

(56) References Cited

U.S. PATENT DOCUMENTS

| | | | | |
|---|---|---|---|---|
| 8,570,861 | B1* | 10/2013 | Brandwine | H04L 45/70 370/230 |
| 11,818,580 | B1* | 11/2023 | Wu | H04W 12/08 |
| 11,863,984 | B2* | 1/2024 | Elliott | H04W 12/08 |
| 2005/0174943 | A1 | 8/2005 | Wang | |
| 2014/0146749 | A1 | 5/2014 | Barker et al. | |
| 2015/0016244 | A1 | 1/2015 | Moeller | |
| 2016/0261516 | A1* | 9/2016 | Gopinathan | H04L 43/0888 |
| 2017/0048278 | A1* | 2/2017 | Tomasso | H04L 63/0272 |
| 2018/0069782 | A1* | 3/2018 | Wosik | H04L 61/2532 |
| 2018/0092011 | A1* | 3/2018 | Lin | H04W 28/0226 |
| 2019/0149399 | A1* | 5/2019 | Reed | H04L 41/0897 709/223 |
| 2019/0254087 | A1 | 8/2019 | Lopes et al. | |
| 2019/0386969 | A1* | 12/2019 | Verzun | H04L 63/123 |
| 2020/0137562 | A1* | 4/2020 | Liang | H04W 12/009 |
| 2020/0389817 | A1 | 12/2020 | Bhatnagar et al. | |
| 2023/0379216 | A1* | 11/2023 | Fu | H04L 41/0826 |

FOREIGN PATENT DOCUMENTS

EP 3131271 A1 2/2017
WO 0067435 A1 11/2000

OTHER PUBLICATIONS

Extended European Search Report for European Application No. 21215541.0, mailed May 9, 2022, (3 pages).
Swedish Office Action for Swedish Application No. 2051515-1, mailed Jul. 1, 2021, (7 pages).

* cited by examiner

MULTI-ROUTER WIRELESS COMMUNICATION SYSTEM WITH CLIENT BALANCING

CROSS-REFERENCE TO RELATED APPLICATIONS

This application claims priority from Swedish Patent Application serial number 2051515-1, filed Dec. 21, 2020, titled "MULTI-ROUTER WIRELESS COMMUNICATION SYSTEM WITH CLIENT BALANCING," the disclosure of which is incorporated herein by reference in its entirety.

TECHNICAL FIELD OF THE INVENTION

The present invention relates to a wireless communication system for moving vehicles, such as trains.

BACKGROUND

The demands on wireless communication capabilities in today's society are increasing rapidly. In particular, there is an increasing demand from passengers to be able to communicate through mobile phones and other handheld devices when traveling. Furthermore, there is also a rapidly growing demand to be able to get access to the Internet with laptops, PDAs, smartphones, and the like when traveling, for example, by train. However, train carriages are made of metal, and even the windows are normally covered with a thin metal film. Thus, train carriages are often shielded compartments, and direct communication between terminal antennas within the carriages and externally located antennas is difficult to obtain. Further, in regard to recent developments in the field of smartphones, and the way these are commonly used, with e.g. continuously operating applications, many smartphones are active at all times, meaning that many handovers are required when the train moves. Even though this problem is common for all moving vehicles, it is especially pronounced for vehicles moving at high speed, such as trains.

To this end, it is known to provide a mobile access router for data communication, also connected both to an external antenna and an internal antenna, in each carriage, in order to provide Internet access on board the vehicle. Such mobile access router solutions are e.g. commercially available from the applicant of the present application, Icomera AB, of Gothenburg, Sweden, and are also disclosed in EP 1 175 757 and EP 2 943 011 by the same applicant. These methods have greatly improved the reliability of high-bandwidth wireless communication for trains and other large vehicles.

However, as the demands on wireless networks continue to increase in today's society new ways of improving the user experience must be developed. A challenging area is WiFi services onboard moving vehicles where many users share the WiFi connection. Wireless networks on vehicles such as trains, buses and airplanes are dependent on a wireless connection to the landside cellular network establish by a router(s) and external antennas mounted on the roof. To provide WiFi inside the vehicle the router(s) is connected to internal antennas connecting the users to the router(s). The routers and/or access points, providing the Internet connection, can only support a limited number of users in order to guarantee a high Quality of Service (QoS). Today, the data usage per user is high and continues to increase rapidly requiring high performance router(s) and high-speed connections to the cellular network. Thus, there is a need for an improved user access functionality to handle the high data transfer in order to maintain a high QoS.

To increase the capacity of the vehicle wireless network multiple routers can be used thus increasing the computer processing capability and the cellular bandwidth. In such a system, the data (load) may be shared between the routers, and the routers may have separate cellular connections, i.e. be connected to different cells. Commonly, the vehicle network backbone is divided into separate parts that are not able to communicate with each other. Each sub-network covers a part of the vehicle and is run by one router. The users connecting to sub-network A are assigned to router A and so on. In the case of a train having a dual router system, two sub-networks are used each covering half of the coaches.

However, the existing user sharing solutions rely on the fact that the location of the clients, i.e. the WiFi users, are distributed evenly onboard the vehicle. This is certainly not always the case which will create an unbalanced client sharing between the routers which will cause system overloads thereby degrading the QoS. Furthermore, in the case of reconfigurable networks manual monitoring and control is required to make the data traffic evenly divided between the routers. Also, the user location on a train is likely to change along the route thereby changing the data traffic requiring repeatedly reconfigurations to maintain an even user sharing. Furthermore, client balancing based on manual and/or hardware change is cumbersome and tedious, and not very efficient.

The static solutions impose further problems for vehicles with reconfigurable layouts. In particular, trains have setups where the number of coaches is changeable which affect the wiring of the onboard network. With existing solutions, the user sharing becomes uneven and parts of the network can become isolated causing the WiFi service to malfunction. In the latter case on-site service is needed to restore the network implying long downtime for the service.

Further, in case a router malfunctions, this will cause great problems. In a network configuration comprising sub-networks, a malfunctioning router will cause this section of the network to be inoperative. In a system with switches a communication link between the sub-networks can be manually established, but this requires close remote monitoring and re-configuration and may not be a fast-enough solution.

There is therefore a need for an improved wireless communication system for moving vehicles, which provides better capacity and more efficient utilization of external mobile networks. In particular, there is a need for a method and system with improved client balancing on vehicles, allowing for a smart, automatic, fast, redundant, cost-efficient user balancing independent on vehicle configuration. Even though the above discussion is focused on trains, similar situations and problems are at least to some extent encountered in other types of moving multi-carriage vehicles, such as trams, and also in many other types of moving vehicles.

SUMMARY OF THE INVENTION

It is therefore an object of the present invention to provide a wireless communication system and a method for wireless communication for moving vehicles, and in particular trains, which alleviates all or at least some of the above-discussed drawbacks of the presently known systems.

These objects are achieved by means of a wireless communication system for a moving vehicle as defined in the appended claims.

According to a first aspect of the invention there is provided a wireless communication system for a moving vehicle, said wireless communication system comprising:
- a plurality of routers, each router being configured to:
  - receive and transmit wireless data communication to and from a stationary communication server outside said moving vehicle through at least one exterior mobile network via at least one antenna, wherein said at least one exterior mobile network provides at least one data link;
  - receive and transmit data packets to and from at least one client onboard the moving vehicle;
  - communicate with every other router in said moving vehicle in order to receive and transmit data packets to and from said every other router, thereby forming an onboard router network;
- wherein each router is arranged to receive a media access control address (MAC address) from any client connecting to the onboard router network, and wherein each router is provided with a set of MAC address representations, representing MAC addresses to accept or to ignore, and wherein each router is arranged to analyze said received MAC address and compare it to its set of MAC address representations, and to determine, based on said analysis whether to accept or ignore said client.

The present invention provides a method and wireless communication system for moving vehicle, in particular trains, enabling a redundant client balancing which alleviates the above-discussed drawbacks of the previously known systems.

By analysing the MAC-address of each connected user device in a pre-defined way, clients, such as WiFi clients, can automatically be balanced in a multi-router system, without any hardware modification. The client balancing is done according to a pre-defined pattern, based on the MAC-address, implemented on every router onboard the vehicle. To this end, each router is provided with a set of MAC address representations. If the received MAC address from the client matches the set of MAC address representations, the client determines to ignore the client, if the set of MAC address representations is an ignore set, or to accept the client, if the set of MAC address representations is an accept set.

The here disclosed way of distributing clients among the available routers is independent of client location, time of client connection and re-connection(s) and number of clients. Realtime MAC recording and inter-router communication provides an automatic redundancy functionality. The new client balancing may further be arranged to automatically re-arrange the clients if a part of the system malfunctions, such as one of the routers. The redundancy re-balancing may be based on the same MAC-address analysis but with adapted, new sets of MAC address representations, i.e. a second client balancing pre-defined pattern, taking the lost routers into account.

The multi-router system comprises at least two routers connected to the landside cellular network with external antennas. However, more than two routers may also be used, such as at least three, at least four or at least five. In one embodiment, at least one router is provided in each carriage in the moving vehicle.

The routers and their associated antennas may be spread out in the moving vehicle to increase the probability to connect to multiple basestations thereby increasing the bandwidth. Clients may connect to the routers e.g. using the vehicle WiFi network, and all routers can communicate with each other through a backbone connection, thereby forming the onboard router network. Any medium can be used for the network backbone such as copper wiring, optical fiber and wireless.

The media access control address, MAC address, is a unique identifier assigned to devices for use in communications, e.g. in IEEE 802.11 networking technologies. MAC addresses typically comprises six groups, octets, of hexadecimal digits, which may be separated by hyphens, colons, or without a separator. The first three octets (octet 1-3) are used as organizationally unique identifiers (OUI), and the last three octets (octet 4-6) are used as network interface controller (NIC) specific identifiers.

Each router in the network receives and analyses the MAC address of each connected client device, independent of the device location in the vehicle. The analysis compares the received MAC addresses to a set of MAC address representations provided in each router.

A set of MAC address representations may contain a set of MAC address, or representations correlated to MAC addresses. For example, the set of MAC address representations may contain a range or listing of full MAC addresses. However, preferably, the MAC address representations are only related to parts of the full MAC addresses, such as to one or a few of the octets. The other octets are then ignored, or substituted by a wildcard, mask or the like. In one embodiment, the set of MAC address representations relate to at least one of the last octets, such as the last octet, or the last two octets. Since these octets are generally determined freely by the manufacturer of the device, and may e.g. be assigned as a running index, independent of device type etc, these numbers are relatively randomized.

For example, a set of MAC address representations may cover a range for the last octet, ranging from a first number XX to a second number YY. The remaining octets may then be ignored, represented by "-" in the following. This set of MAC address representations is then:

--;--;--;--;--;XX to --;--;--;--;--;YY.

Similarly, a set of MAC address representations covering a range for the last two octets, ranging from a first number XX;XX to a second number YY;YY, and with the remaining octets ignored, may then be:

--;--;--;--;XX;XX to --;--;--;--;YY;YY

The numbers XX, YY, XX;XX and YY;YY may be any hexadecimal numbers.

It is then determined whether the received MAC address falls within the set of MAC address representations for the router. In the illustrative example, it would then be determined whether the last octet ZZ of the received MAC address falls within the range XX to YY, if only the last octet is considered, or whether the last two octets ZZ;ZZ of the received MAC address falls within the range XX;XX to YY;YY.

It is also possible to consider other octets, in addition or alternatively to the last one or more octets. For example, it is possible to consider only the second last octet. Other octets may also be considered in the same way, even though these octets are generally less randomized.

In a preferred embodiment, the sets of MAC address representations comprise a range of numbers for at least one octet of the MAC addresses, and preferably at least the last octet. In a preferred embodiment only the last octet is used, however it is also feasible to use the two last octets, or even more octets.

By consideration of octets of the MAC address which are generally randomized and statistically relatively evenly distributed, a well distributed balancing of the clients among the available routers may be achieved, without any prior use of the MAC addresses and the like.

However, the MAC address representations may also be other types of representations. For example, the MAC address representations may be processed MAC addresses. For example, the MAC address representations may be hash values of MAC addresses, or part of MAC addresses. The set of MAC address representations may then e.g. contain a range of hash values. When a new MAC address from a client is received, its hash value is then calculated, and compared to the hash values of the set of MAC address representations related to such hash values.

As further examples, the MAC address representations may also be checksums of MAC addresses, fingerprints of MAC addresses, and other types of more or less randomized functions that may be performed on the MAC addresses.

The sets of MAC address representations may be related to MAC addresses to ignore, i.e. forming a "black list". In this case, clients having MAC addresses falling within a set of MAC address representations will be ignored, and not accepted by the router. Alternatively, the sets of MAC address representations may be related to MAC addresses to accept, i.e. forming a "white list". In this case, clients having MAC addresses falling within a set of MAC address representations will be accepted, and allowed to communicate through the router.

In one embodiment, the sets of MAC address representations represent MAC addresses to ignore, and wherein each router provides a filter functionality, only accepting clients having MAC addresses not matching the set of MAC address representations. In cases where the router operates as a DHCP server, the filter functionality may e.g. be embodied with the DHCP ignore functionality. This functionality is per se known, and is used to exclude certain MAC addresses to access a network, but can here be modified to provide the sets of MAC address representations discussed above.

The sets of MAC address representations for the different routers are preferably mutually exclusive, whereby a client can only be accepted by one router in the onboard router network.

Further, the sets of MAC address representations for the different routers are preferably comprehensive, and together covering all, or at least nearly all, possible MAC addresses. Hereby, it is ensured that any client will be accepted by one of the routers.

Preferably, the sets of MAC address representations for the different routers are both comprehensive and mutually exclusive, ensuring that any client will be accepted by one, and only one, of the routers in the onboard router network.

The sets of MAC address representations may be of equal size, i.e. all covering essentially the same number of MAC addresses. However, the sets of MAC address representations may also be of different sizes.

Further, the sets of MAC address representations may be static. For example, the sets of MAC address representations may be determined and provided to the routers only once, e.g. by manual interaction, upon initialization of the system. Alternatively, the static sets of MAC address representations may be replaced or updated, e.g. manually, at certain times, such as when the configuration of the system is changed, or at regular time intervals.

However, preferably the sets of MAC address representations is determined dynamically, and preferably in real-time. Hereby, the sets of MAC address representations can be continuously updated to reflect contextual and/or system specific changes, such as variations in bandwidth for the different routers, variations in client load on the routers, malfunctioning of a router, etc. Other features may also be considered for the dynamic determination of the sets of MAC address representations, such as packet loss (intermittent failure for packets of data to arrive), latency (round-trip response time, hence responsiveness), throughput/bandwidth (overall rate of data transmission, whether current or potential) and a variety of radiophysical metrics, such as signal strength.

The dynamic sets of MAC address representations may be created by a controller, functioning as a client balancing controller, and which may run a client balancing algorithm.

The controller may e.g. be arranged to detect malfunction of any of the routers in the onboard router network, and upon detection of a malfunctioning router, be arranged to create an updated set of MAC address representations for the remaining router(s). Hereby, the MAC addresses corresponding to the set of MAC address representations of the malfunctioning router may e.g. be redistributed among the remaining routers.

Additionally, or alternatively, the controller may be arranged to detect the number of currently operative routers in the onboard router network in real-time, and to continuously update the sets of MAC address representations in accordance with this.

Preferably, the sets of MAC address representations are based on the number of operative routers in the onboard router network. In addition, the sets of MAC address representations may further be based on at least one of: the available bandwidth of each router and the data usage for each router.

In one embodiment, the controller is arranged in the stationary communication server, the stationary communication server being arranged to provide the created sets of MAC address representations to the routers. Thus, in this embodiment, the controller is not arranged in the onboard router network. Instead, it may be arranged in a land based, stationary server, and connected to the onboard router network through the at least one exterior mobile network. This is generally a very robust and reliable solution, since it will be capable of handling e.g. situations where any one of the routers malfunctions.

In another embodiment, the controller is arranged in at least one master router of said at least two routers in said onboard router network, wherein said master router provides the respective created set(s) of MAC address representations to the other router(s) in the onboard router network. In such a solution, the system becomes more autonomous, since the controller is a part of the onboard router network. However, it is also in some parts more sensitive. For example, if the master router would malfunction, the controller may become incapable of performing its client balancing tasks.

With the new client balancing, any new or dropped clients will not affect the performance, and the clients experience a non-interrupted WiFi service.

The MAC-address analysis is further preferably performed in such a way that it is independent of client device type and manufacturer, e.g. by considering only the one or two last octets in the MAC address, as discussed in the foregoing. This provides an even client balancing between the routers.

The analysis is done in real time which gives the client balancing algorithm in the router the possibility to react instantly when new devices connect. New clients will not disturb the data traffic flow of already connected devices making latency and jitter sensitive services as Voice over IP (VoIP) non-affected.

The pre-defined sets of MAC address representations, which may also be referred to as pre-defined client balancing pattern, decides to which router a client should be assigned.

Data flow parameters such as client data usage can be taken into account for further load balancing optimization. High data consumption clients can thereby be assigned to routers with more available capacity. The client-router assignment is preferably performed once, at the time of client connection. However, client re-assignment can also be performed occasionally to enhance the system balance.

The sets of MAC address representations, i.e. the balancing pattern, may differ between routers and systems depending on available bandwidth per router, number of cellular links per router and other connected devices onboard the vehicle such as payment devices, CCTV and multimedia devices. The configured pattern may also change depending on time, region and vehicle type.

The herein disclosed client balancing is based on a pattern having unique user device information, MAC-addresses, as input and is therefore independent of the WiFi network size, number of clients, network changes due to vehicle reconfigurations, broadcasting frequency and network configuration such as virtual local area network (VLAN) or subnetwork which virtually divides the vehicle network.

The above-discussed automatic dynamic redundancy functionality may use a second pre-defined client balancing pattern, based on the same MAC-address analysis mentioned above, to takeover and balance the clients assigned to a malfunctioning router. The takeover is preferably done once and the moved clients can at a later stage be automatically re-assigned back to the original router once the system is working properly.

The patterns may depend on the number of routers, available bandwidth per router etc. and may therefore change depending on time, region and vehicle type.

Heavily congested wireless WiFi networks is today a scenario for networks onboard vehicles since the number of passengers and the demands on the WiFi service increase. In order to provide high download speeds and low latency for all passenger multiple router systems are necessary. However, this requires WiFi client balancing between the routers in order to avoid overloaded systems which degrades the performance of the WiFi service. Moving vehicles, especially trains, are systems that change quickly. The number of passengers have a large variation during the day and the vehicle setup, such as number of coaches, different coach types, etc, can change multiple times within a week. Also, the passenger location onboard the trains can change on a minute-by-minute basis.

The present invention provides a client balancing solution taking into account the requirements above. It can balance the clients evenly independent on vehicle configuration, number of passengers and passenger location. The invention uses a method which is independent of device type, which is highly advantageous for moving vehicles where the passenger devices are unknown. The method also supports automatic system redundancy required to achieve high QoS.

The present invention facilitates even balancing in a multi-router system without complex data traffic analysis. The client balancing is automatic requiring no manual configuration of software or hardware making the method fast. It is independent of vehicle configuration thereby introducing a very high degree of freedom for the vehicle operator. The client balancing optimises multi-router systems since the resources of the system become more evenly used by the clients thereby improving the wireless service, such as the WiFi service.

With the present invention the communication between routers and access points is maintained throughout the vehicle network. This is not the case with existing solutions which utilise virtual or physical network separation. The presented client balancing is independent of user device type which is advantageous on moving vehicles having passengers using many different devices. This also makes the client balancing functionality technology future-proof. The access point for the WiFi connection makes no difference to the client balancing, an even balance is therefore obtained independent of passenger location which is not the case with existing solutions. New clients will be balanced between the routers without interrupting the WiFi service for already connected clients. The method of the present invention is therefore truly dynamic since it scales with network size, user device type and number of passengers and their physical location when connecting and the time of connection as well.

The client balancing enables a simple redundancy functionality based on the same MAC-address analysis. Clients can be re-balanced if a router malfunctions with an even client balance between the remaining routers. This is a most important feature for networks on moving vehicles since maintenance is hard while the vehicle is moving.

In the multi-router system, each router preferably comprises at least one, and preferably a plurality, of modems for communication with said at least one exterior mobile network, wherein each modem is in operative connection with each router of the plurality of routers through said onboard router network.

The routers are preferably arranged to communicate with clients onboard the moving vehicle through a wireless local area network standard, and preferably an IEEE 802.11 standard, commonly referred to as WiFi. However, other wireless communication standards may also be used.

Each "router" (or sometimes "mobile router") is a networking router, which is a machine that forwards data packets between computer networks, on at least one data link. The routers may be mobile access routers, and preferably a mobile access and applications routers.

A set of internal LANs may be provided inside the moving vehicle for providing (wireless) communication between each individual router and at least one client (sometimes referred to as terminal) onboard. In one exemplary embodiment, each internal LAN may provide WiFi communication between one router of the plurality of routers and at least one client onboard the moving vehicle. In other words, each carriage is preferably only associated with one internal LAN provided by one router, however, the inventive system allows each client to have indirect access to the other routers via the onboard router network. Moreover, the at least one client onboard may accordingly be connected to one of the plurality of routers via a LAN (local area network) provided by one or more wireless access points within the public transport vehicle. Preferably, at least one such wireless access point is provided in each carriage. Each wireless access point is to be connected to a specific router of the plurality of routers, such that a plurality of clients (or terminals) onboard the moving vehicle are effectively distributed among the plurality of routers by dependence on the location of each client within the moving vehicle, in accordance with the client balancing discussed in the foregoing.

The plurality of routers may be spread out and arranged in specific carriages of the moving vehicle, such as e.g. in a front passenger carriage, a back passenger carriage and/or a café carriage. However, each carriage in the moving vehicle may also be provided with a separate router connected to at least one wireless access point in the same carriage, where the wireless access point may be external to the router or an integrated function of the router.

The land based stationary communication server may be any server or site accessible through the exterior mobile network, such as a DNS server, an ISP infrastructure gateway, an aggregation gateway, a content provider server of interest to vehicle passengers, or the like. For all common applications of this invention, the stationary servers will constitute the Internet, but partly or purely private network applications are also feasible.

Each router and the remote server (stationary communication server) are preferably connected through a plurality of exterior mobile networks, which are simultaneously useable. Also, each router is preferably arranged to communicate with the stationary communication server on at least two different data links (communication routes) having different characteristics, i.e. performance parameters, where the performance parameters can be measured and evaluated by the controller. This may be used to evaluate and links provided by a single router, and to distribute data streams between these links, but may also be used to evaluate links provided by two or more routers, each router providing only one or a limited number of links, and then distributing the data streams between these links accessible through different routers.

The different routers may be arranged to communicate on different data links, i.e. whereby each router is arranged to communicate on at least one different data link as compared to the other routers onboard the moving vehicle. The different data links may e.g. be operated by different mobile network operators.

The data streams from each router may be forwarded on one or several links to and from a dedicated external server, which may be referred to as an aggregation server or gateway. The different links can thereby form a single virtual link between a router and the gateway.

The evaluation of a data link is can for example be performed by the methods as described in EP 2 943 011 by the same applicant, said document hereby incorporated by reference. Furthermore, the plurality of routers may use any available data links, such as two or more of e.g. GSM, Satellite, DVB-T, HSPA, EDGE, 1×RTT, EVDO, LTE, WiFi (802.11) and WiMAX; and combine them into one virtual network connection. In particular, it is preferred to use data links provided through wireless wide-area network (WWAN) communication technologies.

According to another aspect of the invention, there is provided a method for client balancing in a wireless communication system for a moving vehicle, said wireless communication system comprising a plurality of routers onboard said moving vehicle, each of said routers being in communicative contact with every other router in said moving vehicle through an onboard router network, said method comprising:
 providing a set of MAC address representations, representing MAC addresses to accept or to ignore, in each of the routers;
 receiving a media access control address (MAC address) from any client connecting to the onboard router network;
 analyzing in each router said received MAC address and compare it to its set of MAC address representations, and to determine, based on said analysis whether to accept or ignore said client.

These and other features and advantages of the present invention will in the following be further clarified with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DETAILED DESCRIPTION

In the following detailed description, preferred embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention. In the following examples, an embodiment related to a train is disclosed. However, it is to be acknowledged by the skilled reader that the method and system are correspondingly useable on other moving vehicles, such as other vehicles having a plurality of carriages, e.g. trams and the like, but also on other public transportation vehicles, or other vehicles having a need for multiple routers.

Figure 1:
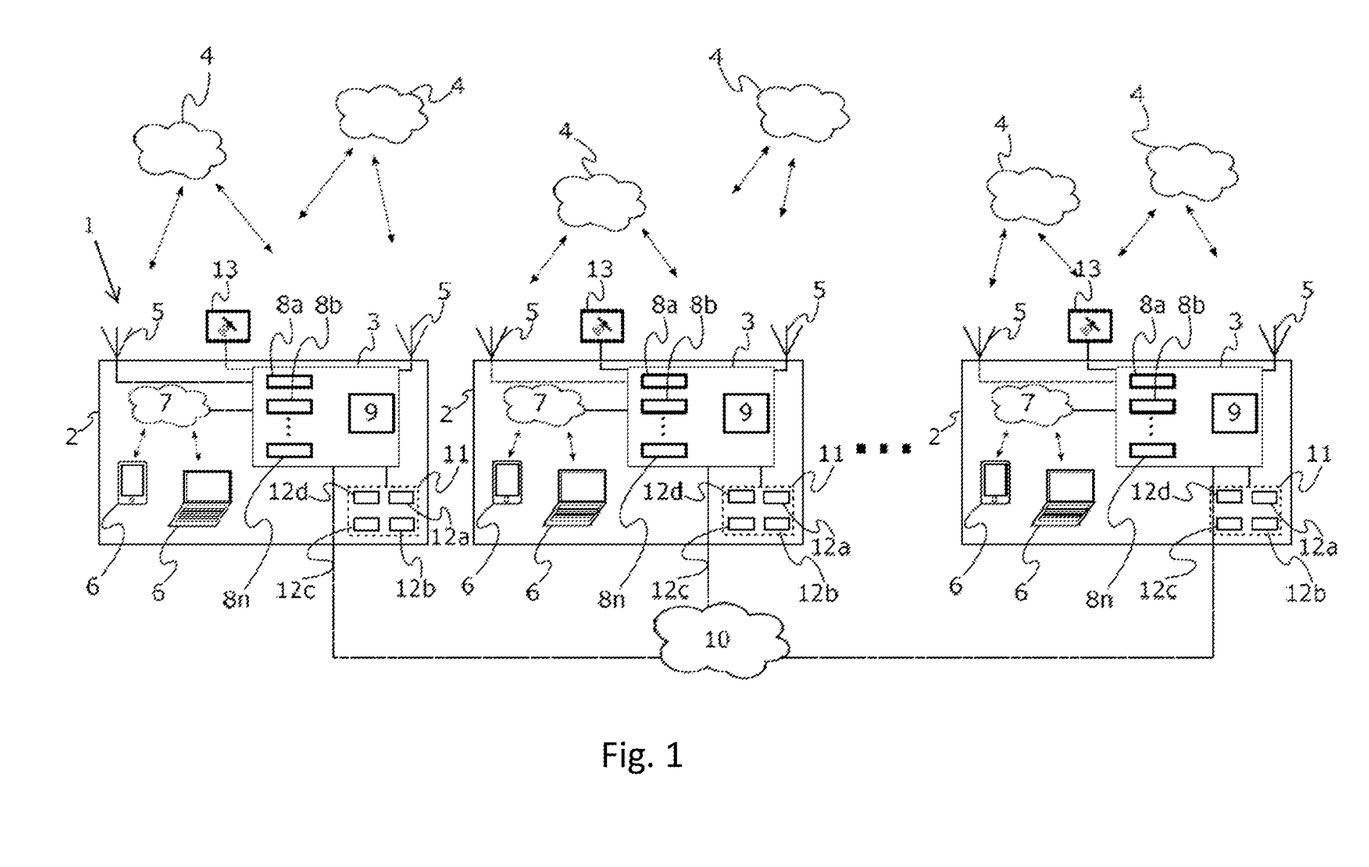
FIG. 1 is a schematic illustration of a train having a wireless communication system in accordance with an embodiment of the present invention.

FIG. 1 shows a schematic illustration of a vehicle 1, in the form of a train, having a plurality of carriages 2, three of which are shown in this figure. The train has a communication system comprising a plurality of data communication routers 3, or simply routers 3, arranged in separate carriages 2 of the vehicle 1. In this particular illustration each carriage 2 is provided with a router 3, however, in other embodiments of the invention only some specific carriages 2 may be provided with a router 3, such as e.g. a front passenger carriage, a rear passenger carriage and a café or restaurant carriage. Several routers may also be provided within in the same carriage(s). The data communication routers 3 may also be denominated MAR (Mobile Access Router) or MAAR (Mobile Access and Applications Router).

However, the routers need not be arranged in different carriages, and it is also feasible to have two or more routers within a single carriage, or in vehicles not having any carriages.

Each router 3 is configured to receive and transmit wireless data communication to and from a stationary communication server through at least one exterior mobile network 4, e.g. external wide area networks (WANs), as indicated by the dashed arrows. Communication to and from the exterior mobile networks 4 is provided via one or several antennas or antenna arrays 5, arranged on the exterior of the vehicle, such as on the roof. The exterior mobile network 4 accordingly provides one data link or several data links between each router 3 and the stationary communication server. In the case where two or more data links are available they can either be between the router 3 and one of the exterior mobile networks 4 and/or by using several exterior mobile networks 4 simultaneously.

Moreover, the routers 3 are configured to receive and transmit data packets to and from one or more clients 6 onboard the vehicle 1 through an internal local area network (LAN) 7. The LAN 7 is preferably a wireless network, using one or several internal antennas to communicate with clients 6 or terminal units 6 within the vehicle 1. The client(s) may be computing devices such as laptops, mobile telephones, PDAs and so on. It is also possible to use a wired network within the vehicle 1. Each router 3 is preferably connected to or part of a separate and different LAN 7 as compared to the other routers 3 within the vehicle 1, for example, if each carriage 2 is provided with one router 3 then each carriage 2 is provided with a separate LAN 7.

The routers 3 are furthermore connected to each other through a backbone, thereby forming an onboard router network 10 in order to receive and transmit data packets to and from each other. This enables clients to connect to any of the routers 3 within the wireless communication system of the vehicle 1, regardless of which router that is closest, and within which router's access area the client is.

The communication system further comprises one or several controllers 9, in this illustration each router 3 is provided with an individual controller 9 that is configured to evaluate a set of performance parameters of the data link(s) between each router 3 and the exterior mobile network(s) 4. The controllers are then to assign data streams to the different data links, in case a router has access to several links, e.g. based on an evaluation of the performance parameters.

The plurality of routers 3 are arranged to communicate on several different communication routes having different characteristics, in some embodiments each router 3 is configured to communicate on at least two different communication routes having different characteristics. However, the system allows for the different routers 3 within the train to have separate and different communication routes to and from the exterior mobile network 4, e.g. owned by different network operators. The various data streams can be transferred and distributed among the different data links, based on e.g. available bandwidth, such that clients 6 onboard the train 1, are always sure to receive the best data connection available.

The transferring of data streams through different data links may additionally or alternatively comprises the two main steps: evaluation and assignment. Each of these permits some variability. Numerous types of tests, generating a predictable response, such as an echo, could be performed to evaluate link quality, and such tests can be combined in any order, serially or in parallel. The following are only examples.

Any of a variety of common Internet functions can be taken to indicate the usefulness of a link. For example, a WWAN Internet service provider (ISP) will normally offer the addresses of one or more domain name system (DNS) servers, an essential service. DNS queries can be bound to each link, to attempt to resolve a largely arbitrary domain name using one of the ISP's provided servers, or any other. Failure to respond within a given time frame is taken to mean either a general problem transferring the small amount of data, or a more specific problem with the queried DNS server.

Another example of an embodiment therefore uses the ICMP protocol. In this protocol, an ECHO_REQUEST datagram is used to elicit an ECHO_RESPONSE from an arbitrary remote host, preferably a very stable one.

These embodiments for evaluation mentioned thus far can be generalized as one: any active sending of a request or other provocation across a network, through a specific link, with the expectation of receiving a response under a timeout or corresponding safeguard. Variations on this theme include factors such as protocol, target host location, the amount of traffic sent and solicited, and the precise limit set by the timeout function. Obviously, factors external to the individual test, such as the interval between repetitions of the same type of test, is also a potential subject of fine tuning. These and other methods for evaluation are known from EP 2 943 011 by the same applicant, said document hereby incorporated by reference.

In addition or as an alternative, the evaluation can also be made on the pay-load, i.e. the transmitted data streams, by identification and evaluation of response times, etc.

The system may also comprise a global positioning system (GPS) receiver 13 for receiving GPS signals indicative of the current position of the vehicle, and wherein the controller may be arranged to assign data streams to various data links also partly in dependence on said received GPS signals.

Furthermore, the router comprises a plurality of SIMs 12 *a-d*. The number of SIMs is in this particular illustration 4, but preferably at least two, such as e.g. six, ten or twelve. The SIMs 12 form a common SIM pool 11, accessible for each of the modems 8 *a*-N within each router, and also to each different router 3 connected to the onboard router network 10 within the vehicle 1. The SIMs 12 are preferably SIM cards, and the SIM pool 11 is realized as a SIM card holder, comprising a plurality of slots for receiving a plurality of SIM cards. Periodical assignment of one or several of the SIM(s) to any modem is controlled by the controller(s) 9.

The assignment of SIMs to modems at every specific time is preferably determined based on a set of rules in the controller. The set of rules may e.g. be used to assign SIMs to the modems based on information such as in which country the vehicle is currently travelling, the amount of data that has been conveyed by use of the different SIMs, the current price related to conveying data through the different SIMs, the type of data being conveyed, etc.

Pooling of SIM cards within a single router is per se known from EP 2 518 977, by the same applicant, said document hereby incorporated by reference. Further, it is per se known to pool a set of SIMs 12 in each router 3 and make each SIM pool 11 available to each router through the onboard router network 10, to further improve system performance. This is known from EP 3280164, by the same applicant, said document hereby also incorporated by reference.

Distribution and balancing of the clients among the routers is provided by provision of a set of MAC address representations in each router. The sets may define MAC addresses to be accepted or, alternatively, to MAC addresses to be ignored. The sets are preferably mutually exclusive and comprehensive, so that every possible MAC address will be accepted by a single router among the plurality of routers.

When a new client is connecting to the onboard router network, the routers receive a MAC address from the client. All the clients then determines whether the received MAC address matches the set of MAC address representations in the routers, and based on this, each router determines whether to accept or ignore the new client. In the end, one router will accept the new client, whereas the other routers will ignore the new client.

Figure 2:
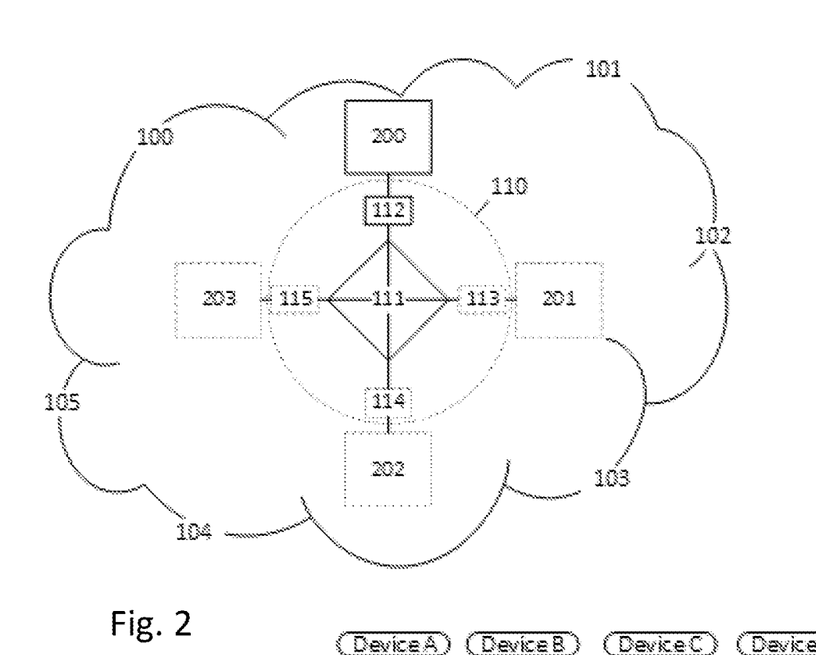
FIG. 2 is another schematic illustration of a multi-router wireless communication system in accordance with an embodiment of the present invention.

The client balancing may be implemented in several ways depending on network architecture, router capacity and antenna array configuration. FIG. 2 illustrates a simplified schematic view of the client balancing as implemented on the communication router with an IP host server 200. The clients 100-105 are connected to the network and thereby to all the routers, and the forwarded MAC addresses are used as input to the MAC-address analysis 111. The result is input to the filter 112, defined by a pre-defined pattern, in the form of a set of MAC address representations, distributed to the routers by the remote controller 110. For the remaining routers 201-203, the client balancing is performed according to the same pattern but with filters 113-115. The filters may be realized in software, e.g. by use of the DHCP ignore functionality.

In the illustrative example, the remote controller may be arranged in a remote, land based server, connected to the onboard router network through the exterior network(s). However, alternatively, the controller can be arranged within the onboard router network, such as in one of the routers acting as a master router.

The set of MAC address representations may contain a range or listing of full MAC addresses. However, preferably, the MAC address representations are only related to parts of the full MAC addresses, such as to one or a few of the octets. The other octets are then ignored, or substituted by a wildcard, mask or the like. In one embodiment, the set of MAC address representations relate to at least the last octet, such as the last octet, or the last two octets. However, the MAC address representations may also be other types of representations. For example, the MAC address representations may be processed MAC addresses. For example, the MAC address representations may be hash values of MAC addresses, or part of MAC addresses. The set of MAC address representations may then e.g. contain a range of hash values. When a new MAC address from a client is received, its hash value is then calculated, and compared to the hash values of the set of MAC address representations related to such hash values.

As further examples, the MAC address representations may also be checksums of MAC addresses, fingerprints of MAC addresses, and other types of more or less randomized functions that may be performed on the MAC addresses.

The sets of MAC address representations may be related to MAC addresses to ignore, i.e. forming a "black list". In this case, clients having MAC addresses falling within a set of MAC address representations will be ignored, and not accepted by the router. Alternatively, the sets of MAC address representations may be related to MAC addresses to accept, i.e. forming a "white list". In this case, clients having MAC addresses falling within a set of MAC address representations will be accepted, and allowed to communicate through the router.

Preferably, the sets of MAC address representations for the different routers are both comprehensive and mutually exclusive, ensuring that any client will be accepted by one, and only one, of the routers in the onboard router network.

Figure 3:
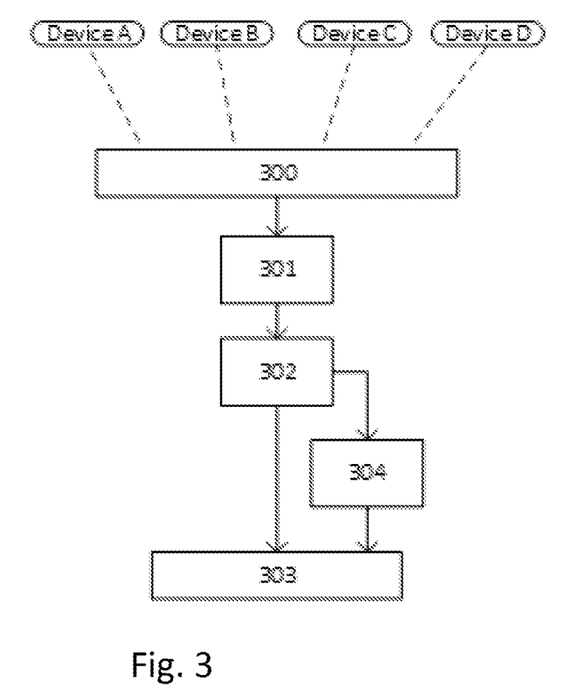
FIG. 3 is a schematic flow chart illustrating an client balancing operation for a router in accordance with an embodiment of the invention.

FIG. 3 shows a schematic flow chart of the WiFi client balancing implemented on all routers with the redundancy functionality. The MAC-addresses of the connected devices are input to the MAC-address analysis 300. The result is compared to the pre-defined pattern 301, i.e. the sets of MAC address representations, which filters the clients to the specific router. A redundancy function 302 may perform a life-check of all communication routers. If it is established that at least one router has failed, a second pre-defined pattern 304 is used, i.e. modified sets of MAC address representations. Hereby, the clients previously assigned to the now failing router may be re-assigned to the remaining, still operative routers. The clients passing the filtering may be hosted by the communication router 303.

The check to establish whether all routers are still operative, and to determine a failure in any of the routers, is preferably made repeatedly and continuously.

The pre-defined patterns, formed by the sets of MAC address representations, can be configured to depend on user specific data consumption in order to further optimize the client balancing. By using MAC-address based client balancing the method becomes highly dynamic and scalable. As FIG. 2 illustrates, new clients will be distributed among the routers in the same manner and extending the network with more routers is possible as well. The use of access points, switches or other equipment within the vehicle network will not disturb the client balancing.

The invention has now been described with reference to specific embodiments. However, several variations of the communication system are feasible. For example, the routers may be provided in different compartments or carriages of the vehicle, or several routers in the same carriage or compartment. Further, the client balancing between the routers may be obtained by various forms of MAC address representations, such as by use of only part of the full MAC addresses, by using a processed version of the MAC addresses, such as by hashing, or the like. Such and other obvious modifications must be considered to be within the scope of the present invention, as it is defined by the appended claims. It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting to the claim. The word "comprising" does not exclude the presence of other elements or steps than those listed in the claim. The word "a" or "an" preceding an element does not exclude the presence of a plurality of such elements.

The invention claimed is:

1. A wireless communication system for a moving vehicle, said wireless communication system comprising:
   a plurality of routers, each router being configured to:
      receive and transmit wireless data communication to and from a stationary communication server outside said moving vehicle through at least one exterior mobile network via at least one antenna, wherein said at least one exterior mobile network provides at least one data link;
      receive and transmit data packets to and from at least one client onboard the moving vehicle;
      communicate with every other router in said moving vehicle in order to receive and transmit data packets to and from said every other router, thereby forming an onboard router network;
   wherein each router is arranged to receive a media access control address (MAC address) from any client connecting to the onboard router network, and wherein each router is provided with a set of MAC address representations, representing MAC addresses to accept or to ignore, and wherein each router is arranged to analyze said received MAC address and compare it to its set of MAC address representations, and to determine, based on said analysis whether to accept or ignore said client, wherein the sets of MAC address representations for the different routers are mutually exclusive, whereby a client can only be accepted by one router in the onboard router network.

2. The wireless communication system of claim 1, wherein the sets of MAC address representations for the different routers are comprehensive, together including every possible MAC address.

3. The wireless communication system of claim 1, wherein the sets of MAC address representations are created by a controller.

4. The wireless communication system of claim 3, wherein the controller is arranged to detect malfunction of any of the routers in the onboard router network, and upon detection of a malfunctioning router, being arranged to create an updated set of MAC address representations for the remaining router(s).

5. The wireless communication system of claim 4, wherein the updated set of MAC address representations for the remaining router(s) re-assigns the MAC addresses of any malfunctioning router to the remaining router(s).

6. The wireless communication system of claim 3, wherein the controller is arranged to detect the number of currently operative routers in the onboard router network in real-time, and to continuously update the sets of MAC address representations in accordance with this.

7. The wireless communication system of claim 3, wherein the controller is arranged in the stationary communication server, the stationary communication server being arranged to provide the created sets of MAC address representations to the routers.

8. The wireless communication system of claim 3, wherein the controller is arranged in at least one master router of said at least two routers in said onboard router network, wherein said master router provides the respective created set(s) of MAC address representations to the other router(s) in the onboard router network.

9. The wireless communication system of claim 1, wherein the sets of MAC address representations are based on the number of operative routers in the onboard router network.

10. The wireless communication system of claim 9, wherein the sets of MAC address representations are further based on at least one of: the available bandwidth of each router and the data usage for each router.

11. The wireless communication system of claim 1, wherein the sets of MAC address representations comprise a range of numbers for at least one octet of the MAC addresses.

12. The wireless communication system of claim 1, wherein the sets of MAC address representations comprise a range of numbers for at least the last octet of the MAC addresses.

13. The wireless communication system according to claim 1, wherein each router comprises at least one modem for communication with said at least one exterior mobile network, wherein each modem is in operative connection with each router of the plurality of routers through said onboard router network.

14. The wireless communication system according to claim 1, wherein each router comprises a plurality of modems for communication with said at least one exterior mobile network, wherein each modem is in operative connection with each router of the plurality of routers through said onboard router network.

15. The wireless communication system according to claim 1, wherein the sets of MAC address representations represent MAC addresses to ignore, and wherein each router provides a filter functionality, only accepting clients having MAC addresses not matching the set of MAC address representations.

16. The wireless communication system according to claim 1, wherein the routers are arranged to communicate with clients onboard the moving vehicle through a wireless local area network standard.

17. The wireless communication system according to claim 1, wherein the routers are arranged to communicate with clients onboard the moving vehicle through an IEEE 802.11 standard.

18. The wireless communication system according to claim 1, wherein the routers onboard the moving vehicle are connected through a wired backbone, thereby forming said onboard router network.

19. A method for client balancing in a wireless communication system for a moving vehicle, said wireless communication system comprising a plurality of routers onboard said moving vehicle, each of said routers being in communicative contact with every other router in said moving vehicle through an onboard router network, said method comprising:
providing a set of media access control address (MAC address) representations, representing MAC addresses to accept or to ignore, in each of the routers;
receiving a MAC address from any client connecting to the onboard router network;
analyzing in each router said received MAC address and compare it to its set of MAC address representations, and to determine, based on said analysis whether to accept or ignore said client;
wherein the sets of MAC address representations for the different routers are mutually exclusive, whereby a client can only be accepted by one router in the onboard router network.

20. The method according to claim 19, wherein the sets of MAC address representations for the different routers are comprehensive, together including every possible MAC address.

21. The method according to claim 19, further comprising:
detecting a malfunction of any of the routers in the onboard router network, and upon detection of a malfunctioning router, creating an updated set of MAC address representations for the remaining router(s).

\* \* \* \* \*